United States Patent
Cotton et al.

[15] 3,680,053

[45] July 25, 1972

[54] DATA TRANSMISSION SYSTEMS

[72] Inventors: John Michael Cotton; Peter Anthony Lloyd, both of Taplow, England

[73] Assignee: Plessey BTR Limited, Taplow, England

[22] Filed: April 13, 1970

[21] Appl. No.: 27,631

Related U.S. Application Data

[63] Continuation-in-part of Ser. No. 638,803, May 15, 1967, Pat. No. 3,444,755.

[30] Foreign Application Priority Data

May 17, 1966 Great Britain ....................21,829/66

[52] U.S. Cl. ....................340/172.5

[51] Int. Cl. ....................G06f 9/18

[58] Field of Search ....................340/172.5

[56] References Cited

UNITED STATES PATENTS

| | | | |
|---|---|---|---|
| 3,425,037 | 1/1969 | Patterson et al. | 340/172.5 |
| 3,210,733 | 10/1965 | Terzian et al. | 340/172.5 |
| 3,336,582 | 8/1967 | Beausoleil et al. | 340/172.5 |
| 3,403,382 | 9/1968 | Frielinghaus et al. | 340/172.5 |
| 3,456,242 | 7/1969 | Lubkin et al. | 340/172.5 |

*Primary Examiner*—Paul J. Henon
*Assistant Examiner*—Sydney R. Chirlin
*Attorney*—Young and Thompson

[57] ABSTRACT

A data transmission highway, in the form of a ring has a plurality of data handling devices connected thereto. A different priority number is allocated to each device. When a device wishes to transmit data it first transmits its own priority number on the highway and the device having the highest priority number of the devices which wish to transmit is allowed to seize the highway.

5 Claims, 12 Drawing Figures

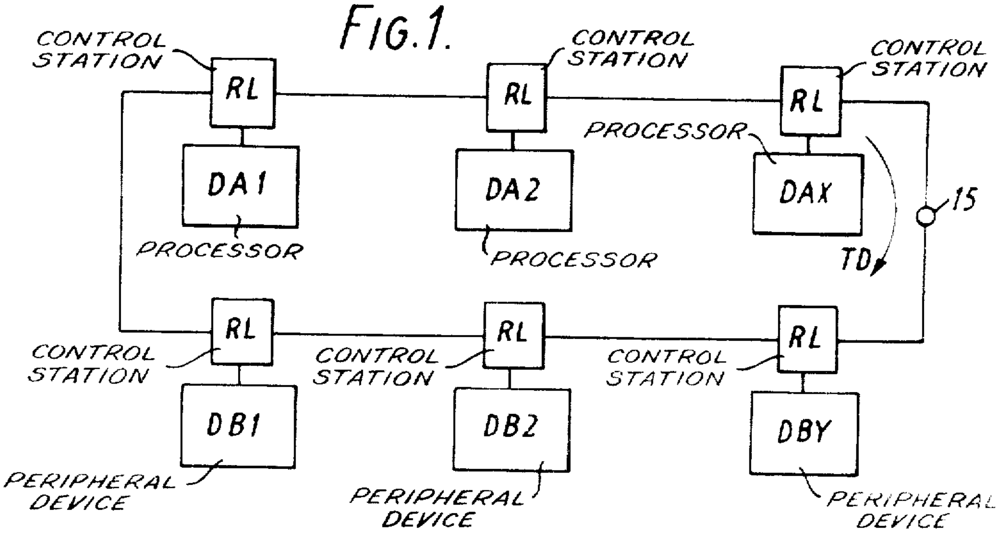

FIG. 1.

FIG. 2.

| TRANSMITTER TO RECEIVER CODES | | |
|---|---|---|
| CODE | DECODE REF | SIGNIFICANCE |
| 0000 | (A) | FREE HIGHWAY |
| 1000 | (B) | PRIORITY ESTABLISHMENT |
| 0100 | (C) | DESTINATION CHARACTERS |
| 0110 | (D) | DATA CHARACTERS |
| 0111 | (E) | QUEUE EMPTY |
| 1101 | (F) | RESPONSE CHANGEOVER |
| 1111 | (G) | FAULT |
| 0101 | (H) | RESPONSE C/O PERFORMED |
| RECEIVER TO TRANSMITTER CODES | | |
| 1001 | (J) | DESTINATION FREE |
| 1010 | (K) | END OF BLOCK |
| 1011 | (L) | DESTINATION BUSY |
| 0011 | (M) | QUEUE FULL |

FIG. 6.

| | | | |
|---|---|---|---|
| FIG.4a. | FIG.4b. | FIG.5a. | FIG.5b. |
| FIG.4c. | FIG.4d. | FIG.5c. | FIG.5d. |

INVENTORS
JOHN MICHAEL COTTON
PETER ANTHONY LLOYD
BY Young & Thompson
ATTYS

DATA TRANSMISSION SYSTEMS

This application is a continuation-in-part of our application Ser. No. 638,803, filed May 15, 1967 now U.S. Pat. No. 3,444,755.

The present invention relates to data transmission or similar signalling systems and is particularly concerned with arrangements involving a so-called data highway, by which is meant a common channel which is available to a number of stations under which they make use on a time-sharing basis. The devices at such stations may be computers, data-collection, data-distribution or other data manipulating devices.

In a system of the type contemplated, the useage of the highway is normally in accordance with a particular priority rating, that is to say, a message which has a high priority takes precedence over one of lower priority and if the traffic is heavy, low priority messages may have to wait an appreciable time. Heretofore, it has been customary to provide a central station which controls use of the highway. Devices having messages to transmit, make application to the central station which then determines which of such devices has the highest priority. It is an object of the present invention to provide an electrical signalling system of this type which does not require the provision of a central station to control use of the highway.

According to the invention, in an electrical signalling system for transmission of data from any one to any other of a plurality of signalling stations connected by a common highway in the form of a ring, there are provided means at each station for storing a priority number for said station, means at each station for transmitting said priority number on said highway when said station desires to seize the highway and means at each station for comparing said stored priority number with any priority number received at said station on said common highway to determine whether such received priority number is greater than, less than, or equal to said stored priority number. Thus, each station wishing to transmit a message determines whether its own priority number is higher than the priority number of any other station wishing to transmit a message at the same time. Consequently, no central controlling station for the highway is required.

The priority number of any station is preferably set up on a register in the station and may be altered by either external or internal control if this becomes desirable. The priority number of a station may also be used as the address of that station for the receipt of messages.

The register for storing the priority number may also be used as a temporary store for incoming and outgoing message characters. While this is taking place, the address must be stored elsewhere. At such times, however, it may be stored in a place where it cannot be directly referred to.

According to a preferred from of the invention, during signalling, the transmission of a further signalling element is only allowed to proceed when the previous element has been transmitted completely around the ring and the received signal is found to correspond to the transmitted signal.

The highway may take the form of a plurality of wires, some of which are allocated to the transmission of data signals while the others are used for the transmission of control signals. In this case, the signals on the individual wires may be direct voltage or current signals. An alternative approach is to use a modulated carrier on a single conductor.

The invention will be better understood from the following description at one method of carrying it into effect which should be taken in conjunction with the accompanying drawings, in which:

FIG. 1 shows, in broad outline, the type of data transmission system to which the invention relates;

FIG. 2 shows, in table logic form, the codes employed on the code wires of the highway of the system shown in FIG. 1;

Figure 3:
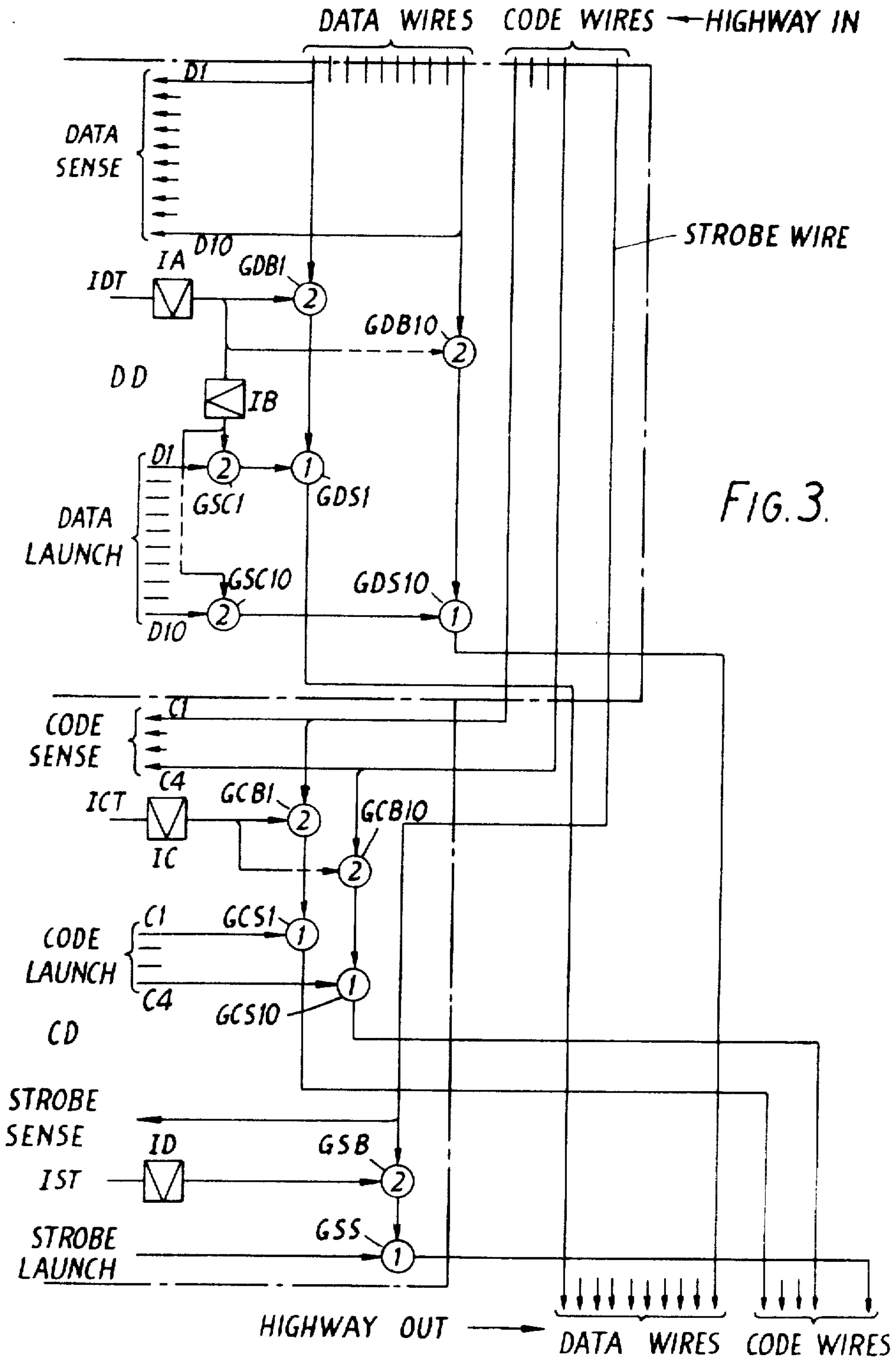
FIG. 3 shows, in detailed logic form the apparatus employed in the data drive and code drive units associated with a single highway drive control unit.

FIGS. 4*a*, 4*b*, 4*c* and 4*d* show in detail logic form, a buffer unit of a highway station;

FIGS. 5*a*, 5*b*, 5*c* and 5*d* show in detail logic form, a single highway drive control unit; and FIG. 6 shows how FIGS. 4*a*, 4*b*, 4*c*, 4*d*, 5*a*, 5*b* 5*c* and 5*d* should be assembled to form a single drawing.

FIG. 1 shows, in block schematic form, the general arrangement of a data highway in the form of a ring. Six devices DA1, DA2, DAX, DB1, DB2, and DBY are shown as connected thereto, connection in each case being made by respective control or highway station equipment RL. It will, of course, be appreciated that additional devices may be connected to the highway if desired.

The devices referred to may conveniently be the various equipments of a multi-processor data processing system. For example devices DA1, DA2 and DAX may be processors or computers while devices DB1, DB2 and DBY may be peripheral devices for use with the processors. Each device is arranged to include a simple device highway station interface which converts the highway station signals into those produced or active upon the particular device. The data transmission system of the invention provides for the passage of messages between the various devices for use in the processing of for example telephone exchange control functions. The devices themselves may be of known construction and design and adapted to function in known manner.

As indicated, the highway consists of fifteen conductors or wires. Ten of these are used for the transmission of data and five for the transmission of control signals.

Each data character is composed of ten bits which are applied to the different data wires simultaneously so that the system operates on a parallel basis. Of the five control wires, four are used for the transmission of control signals comprising the codes indicated in FIG. 2, each digit of the code being transmitted on a respective control wire. The fifth control wire is used for transmission of strobe signals.

The actual significance of many of the codes shown in FIG. 2 will be discussed in detail with reference to FIGS. 4 and 5.

Each control equipment or highway station RL consists of a buffer unit and a highway drive control unit. The buffer unit effectively controls the highway drive control unit when a data transfer is in progress by extension of sequence signals which will be active in the highway drive control unit.

While the data transfer is in progress the buffer unit extends indication signals to the device which responds with condition signals. These condition signals are translated in the buffer unit to produce sequence signals to control the codes and data extended o the highway from the code drive and the data drive units associated with the selected drive control unit.

Each highway station in the system is allocated at least one N bit hardware address, (conveniently N may be equal to the number of bits in the data wire section of a highway i.e., 10). The system is not provided with a discrete overall communication selection and control mechanism and for selection purposes the priority level of a highway station, and hence the device it serves, is defined by the value of it's handware address.

When a device such as DA1 in FIG. 1 wishes to communicate with another device such as DBY in FIG. 1 it first has to obtain the highway. This operation is performed by the highway drive control unit associated with the originating device DA1 extending its own priority address on the data wires together with the "priority establishment" code (1000) on the code wires of the highway after "breaking" the ring. If no other device on the highway is simultaneously attempting to seize the highway the highway station associated with device DA1 will receive back its own priority address together with the priority establishment code indicating that highway is available for use on the desired data transfer.

It will be realized that other devices may be attempting simultaneous seizure of the highway and under these circumstances each highway drive control unit on that ring observes a strict set of rules, which will be discussed later with reference to FIG. 5, culminating in the fact that the demanding device having the highest priority address obtains the highway to the exclusion of all other devices.

Having obtained the highway the drive control unit informs the associated buffer unit of the fact which in turn indicates to the demanding device. The device now presents to the buffer unit the address of the required device, for example device DAX in FIG. 1. This "destination address" is then presented to the highway accompanied by the same "priority establishment" code (1000) and a strobe pulse on the fifth code wire with the ring still "broken."

At this stage all the drive control units on the highway will be set to a "highway busy" condition and the extension of the destination address on the data wires of the highway causes an interrogation process to be performed at each highway station which is intermediate the demanding device, device DA1 in FIG. 1, and the required destination device, device DBY in FIG. 1, the direction of transmission being assumed as clockwise as indicated by arrow TD. Each device compares the "destination address" with its own address or addresses and when equivalence is detected the particular highway drive control unit "breaks" the code and strobe wires and connects either the "destination free" (1001) or "destination busy" (1011) codes to the code wires and produces a strobe pulse on the strobe wire again in a clockwise direction of transmission.

The reception of the strobe pulse at the demanding device, device DA1, allows the state of the destination device to be defined (i.e. free or busy). If the destination device is busy the transfer attempt is terminated and a second attempt will be made later. If the destination device is free further 10-bit characters will be circulated from device DA1 to DBY accompanied by control codes on the code wires.

During the message transfer between two highway stations the data is regenerated by the destination device after accepting it. The regenerated data arrives back at the sending highway station where it is compared with the version originally sent. Thus full error checking is provided for the highway system. If the characters do not compare, one retransmission is allowed before the fault is reported.

When the last character of the message has been circulated the "free highway" code (0000) is circulated allowing all the highway drive control units on the highway used to be returned to normal allowing them to initiate or receive further messages.

In the above broad outline of the system reference has been made to the "breaking" of the highway loop in the data and drive units associated with a drive control unit. Fig. 3 shows typical data and control drive units DD and CD respectively. The top of FIG. 3 shows the incoming highway (HIGHWAY IN) consisting of ten DATA WIRES and five CODE WIRES, one of which is the STROBE WIRE. The DATA WIRES are connected to the associated highway drive control unit as DATA SENSE and also to ten two-input AND gates GDB1 to GDB10, only the first and last being shown for simplicity in FIG. 8. The second input to gates GDB1 to GDB10 is provided by the output of inverter IA which is fed with a '1' state signal IDT (inhibit data through). Hence when this signal is activated to the '1' state gates GDB1 to GDB10 are all closed effectively "breaking" the ring at that point. As mentioned above when the data wires are "broken" the associated device may launch data onto the highway and this is performed by applying the required data to the DATA LAUNCH leads. Gates GSC1 to GSC10 will be primed by the '1' state signal IDT, by the inverted output from inverter IB, allowing the data on the DATA LAUNCH leads to be applied via OR gates GDS1 to GDS10, onto the DATA WIRES of the outgoing highway HIGHWAY OUT.

Similarly the code wires are applied to the associated control unit over the CODE SENSE leads and the code wire path can be "broken" by the activation of the inhibit code through signal ICT and new codes may be launched by way of the CODE LAUNCH leads.

Finally the STROBE WIRE may be subjected to similar "-breaking" arrangements, using the inhibit strobe through signal IST and the STROBE SENSE and STROBE LAUNCH leads.

Consideration will now be given in more detail, with reference to FIGS. 4 and 5 to the above operating procedures. These figures consist of four sections each, FIGS. 4*a*, 4*b*, 4*c* and 4*d* together with figs. 5*a*, 5*b*, 5*c* and 5*d*, and they should be arranged as shown in FIG. 6. FIG. 4 shows the logic of the buffer unit while FIG. 5 shows the highway drive control unit.

As mentioned previously each buffer unit (FIG. 4) is controlled by signals from the associated device and it provides indication signals back to the device while a transfer is in progress. Additionally the buffer unit produces sequence signals which are extended to the associated highway drive control unit of the highway station while this drive control unit produces condition signals which are fed back to the buffer unit. Each buffer unit includes a buffer state counter BSC in FIG. 4b which has three stages BO, B1 and B2. When the buffer unit is idle (i.e. not involved in a data transfer although highways associated therewith may be busy) the state counter remains in state B0. Each highway drive control unit (FIG. 5) includes a highway state counter HSC (FIG. 5*c*/FIG. 5*d*) which has seven states S0 to S7. When the highway is not in use all the highway drive control units connected thereto will have their highway state counters in state 0. It should be noted in FIGS. 5*a*, 5*b*, 5*c* and 5*d* that certain gates have leads connected thereto which are referenced by a single number between 0 and 6. These represent connections from the highway state counter of that drive control unit and this counter is arranged to produce a '1' state output on one lead, while all other leads are in the '0' state, in accordance with its current state. For example while the highway is idle a '1' state signal will be produced from state SO of counter HSC in FIG. 5*c* causing a '1' state condition on lead 0 thereby priming for example the input of AND gate BC26 referenced 0.

In the following description use will be made of a series of equations which will trace the path used in the logic diagram to produce a particular signal, to set a toggle or to open a gate. These equations are not to be construed as boolean statements and are only included to simplify the presentation of the description.

In FIGS. 4 and 5 various gates are shown and those which include a number 1 within their symbol are so-called OR gates producing a '1' state output when one or more inputs are in the '1' state. Those gates which include a number greater than 1 (e.g. 3 in gate G2 FIG. 4*a*) are so-called AND gates producing a '1' state output when all inputs are in the '1' state. Additionally various toggles are shown in FIG. 4 and these toggles are set (a '1' state output from the 1 side and a '0' state output from the 0 side) by a '1' state input to their 1 side and reset by a '1' state input to their 0 side. Certain toggles in FIGS. 4*a* and 4*d* are provided with two inputs on one side and the input marked * indicates that it is a trailing edge activated input. FIG. 4 includes devices referenced SG1 to SG4 and these devices are delay and pulse generators used to produce accurately timed pulses of a specified duration from a single '0' to '1' going "change" input condition. Finally both FIGS. 4 and 5 include inverters referenced IV1 etc in FIG. 4 and I1 etc in FIG. 5. These devices simply invert the invoming signal producing a '1' state output when their input is in the '0' state and a '0' state output when the input is in the 1 state. Also included in FIGS. 4 and 5 are gate condition signals referenced by letter enclosed in a bracket. These references refer to the outputs from a Decoder in FIG. 4 and a code senser in FIG. 5. Basically these devices are the same and they produce a one-out-of-15 condition in accordance with the code currently on the code wires (i) of the highway connected to the buffer unit if any, in the case of the decoder, and (ii) of the associated highway, in the case of the senser. The significances of the various decoded codes A to M are shown in the tables of FIG. 2 referred to above.

The following description of FIGS. 4 & 5 will be split into four basic sections (i) Sending (ii) Receiving (iii) Response-changeover (iv) Queue conditions and (v) Faults.

I. SENDING

When a device requires to communicate with another device the device first extends to the highway station a proceed signal PROC.

The production of the PROC signal by the demanding device causes the highway station ready signal HSR back to the device from the buffer to be changed to a '0'. Signal PROC also causes the transmit demand toggle TTXD to be set.

$$PROC - G1 - SG1 - SG2.\overline{TEOM}.B0 - G2 - TTXD \quad S1$$

$$-\overline{T2} - \overline{G5} - \overline{G6} - \overline{HSR} \quad S2$$

Equation S1. above indicates that signal PROC going to '1' opens OR gate G1 causing a delayed pulse out of pulse generator SG1 and then a delayed pulse out of pulse generator SG2. The occurrence of the pulse from pulse generator SG2 together with the reset state of toggle TEOM and state B0 from buffer state counter BSC opens gate G2 which sets toggle TTXD. From this point no explanation will be given for each equation presented as the symbols used will be similar to those of equations S1.

The setting of the transmit demand toggle TTXD opens gate G3 to produce signal TXSS. The extension of the transmit signal TXSS will set the highway state counter HSC in this control unit to state 1.

$$TXSS. GC1 - GC2 - S1. \quad S3.$$

It should be noted that gate GC1 will be closed if there is a code on the highway other than (A) (i.e. the free highway code) or if the highway state counter is not in state 0. If gate GC1 is closed when signal TXSS is produced, gate GC3 will be opened to produce TXSF which terminates the production of signal TXSS.

The setting of the highway state counter HSC to state 1 causes (i) the connection of the CODE REG (FIG. 4*b*) and the decoder of the buffer unit to the code wires of the selected highway, equation S4 below, (ii) the "breaking" of the data wires through the data drive unit equation S5 below (iii) the connection of the devices own pre-programmed priority address PPA onto the data wires of the selected highway equation S6 below (iv) the connection of the priority establishment code (B) onto the code wires of this highway from the coder (FIG. 5*b*) equation S7 below (v) the "breaking" of the code wires through the code drive unit, Equation S8 below, and (vi) the breaking of the strobe wire through the code drive unit, Equation S9 below.

$$1 - GC4 - GC5 \quad S4.$$

$$- GC6 - Gc7 \quad S5.$$

$$- GD1 \quad S6.$$

$$1.\overline{B2} - GC8 - LB \quad S7.$$

$$1 - GC9.I5.\overline{0} - GC10 \quad S8.$$

$$1 - GC11.\overline{0}.I5 - GC\ 12 \quad S9.$$

At this stage the originating device is extending its own priority address on the DATA LAUNCH wires while comparing this priority address with the code received on the DATA SENSE data wires.

Ultimately the "incoming" data wires (DATA SENSE) will receive a priority address. If the received priority address is larger than the extended priority address the comparator DATA COMP (FIG. 5*a*) in the control unit will produce a signal LNOH (larger number on highway) indicating that a higher priority device is simultaneously requesting the use of the highway. When this occurs the highway state counter HSC of the control unit associated with the lower priority device is switched to state S3.

$$LNOH.1.B0 - GC13 - S3. \quad S10.$$

The switching of the highway state counter HSC to state 3 effectively converts the highway drive control unit to the "receive mode" and the attempted transmit operation is abandoned.

When the received priority address equals that transmitted, the comparator DATA COMP (FIG. 5*a*) in the drive control unit produces a signal D (indicating data equivalence) which causes a signal DR to be passed to the highway buffer unit.

D ▪ . 1 - GC14 - DR S11.

The reception of signal DR by the buffer unit causes (i) the production of the highway station ready signal selection start signal TXSS equation 14 below and (iii) the switching of the buffer state counter BSC to the B1 state Equation 13 below.

$$DR \equiv . B. B0.ANYH1 - G4 - \overline{T1} - T2.\overline{TEOM} - G5 - G6 - HSR \quad S12.$$

$$G4 - GB1 - TB1 \quad S13.$$

$$G4 - GDR - \overline{TTXD} - G3 - \overline{TXSS} \quad S14.$$

The reception of the highway station ready signal HSR by the demanding device causes a register internal to the device, whose output leads D0 are connected to the buffer data register BDR of the buffer unit, to be loaded with the required destination address. When this operation is complete the device sends the proceed signal PROC. to the buffer unit. The reception of the proceed signal by the highway buffer causes (i) the destination address to be gated into the highway data buffer register BDR, Equation S15 below, (ii) the highway station ready signal to be removed, equation S16 below and (iii) a next instruction ready signal NIR to be passed to the drive control units, Equation S17 below $$PROC - G1 - SG1.\overline{B0} - G14 - SET\ BDR \quad S15.$$

$$- SG2 - \overline{T2} - \overline{G5} - \overline{G6} - \overline{HSR} \quad S16.$$

$$.\overline{H6} - G7 - NIR. \quad S17.$$

Figure 5A:
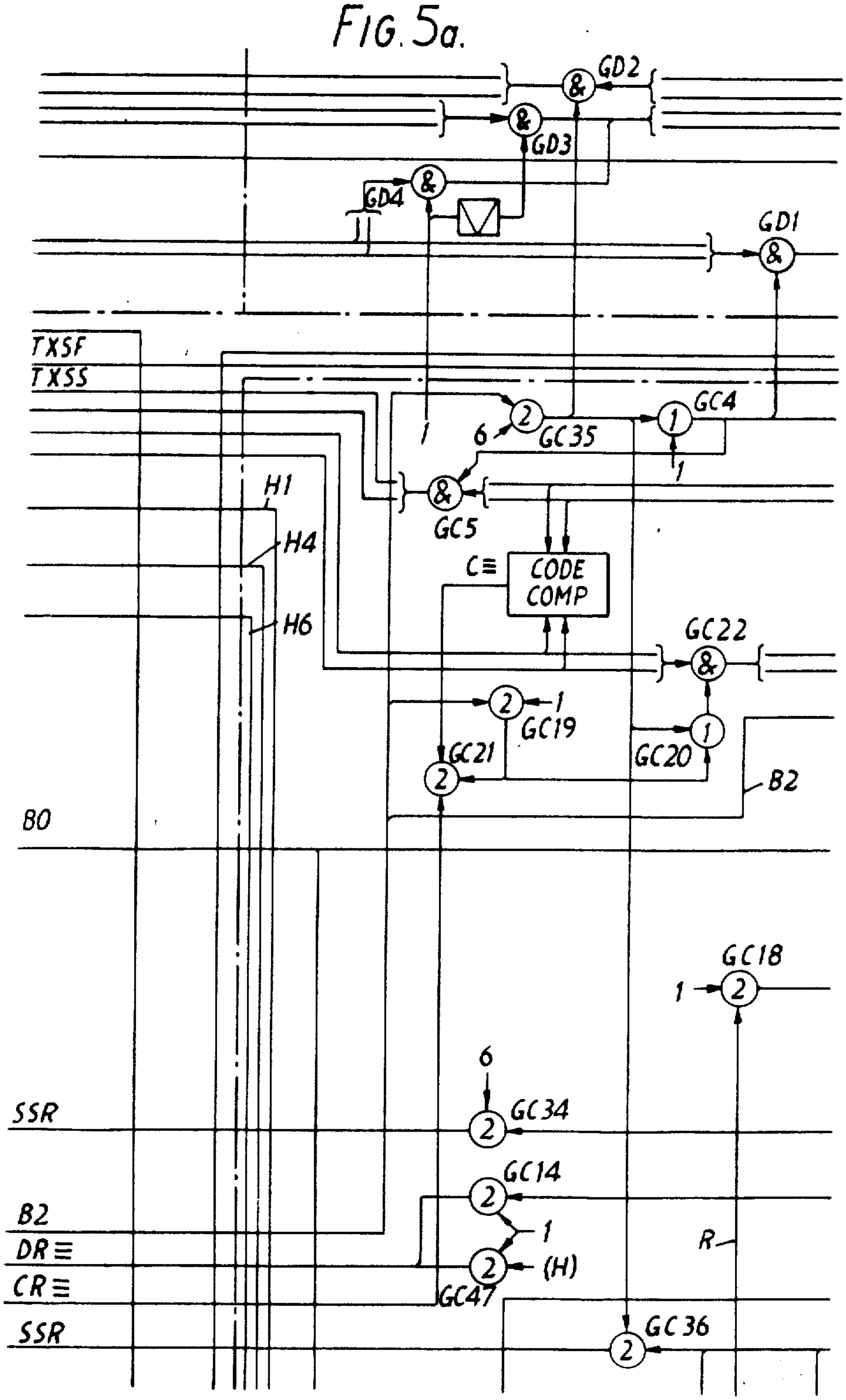
Figure 5B:
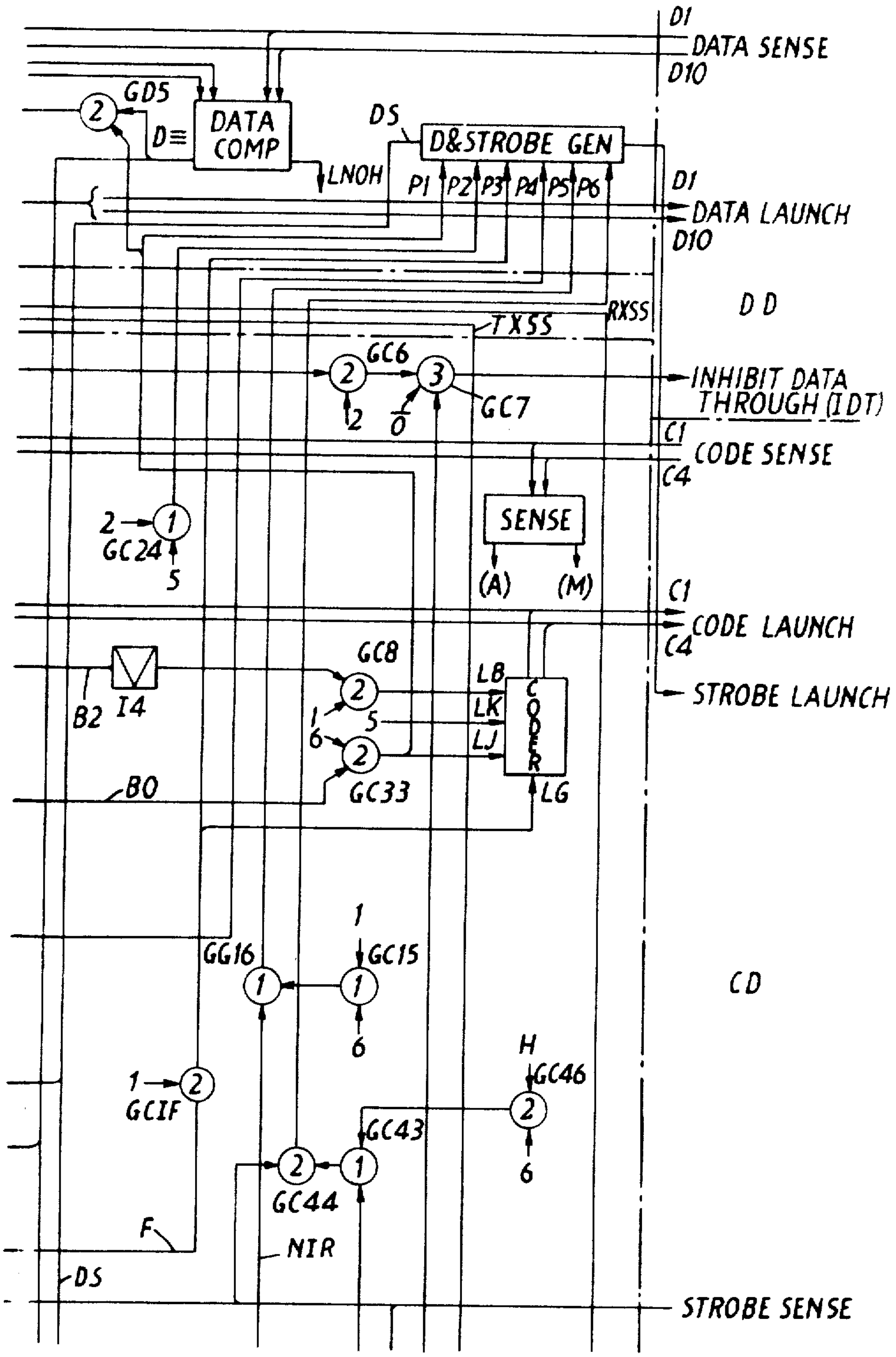
Figure 5C:
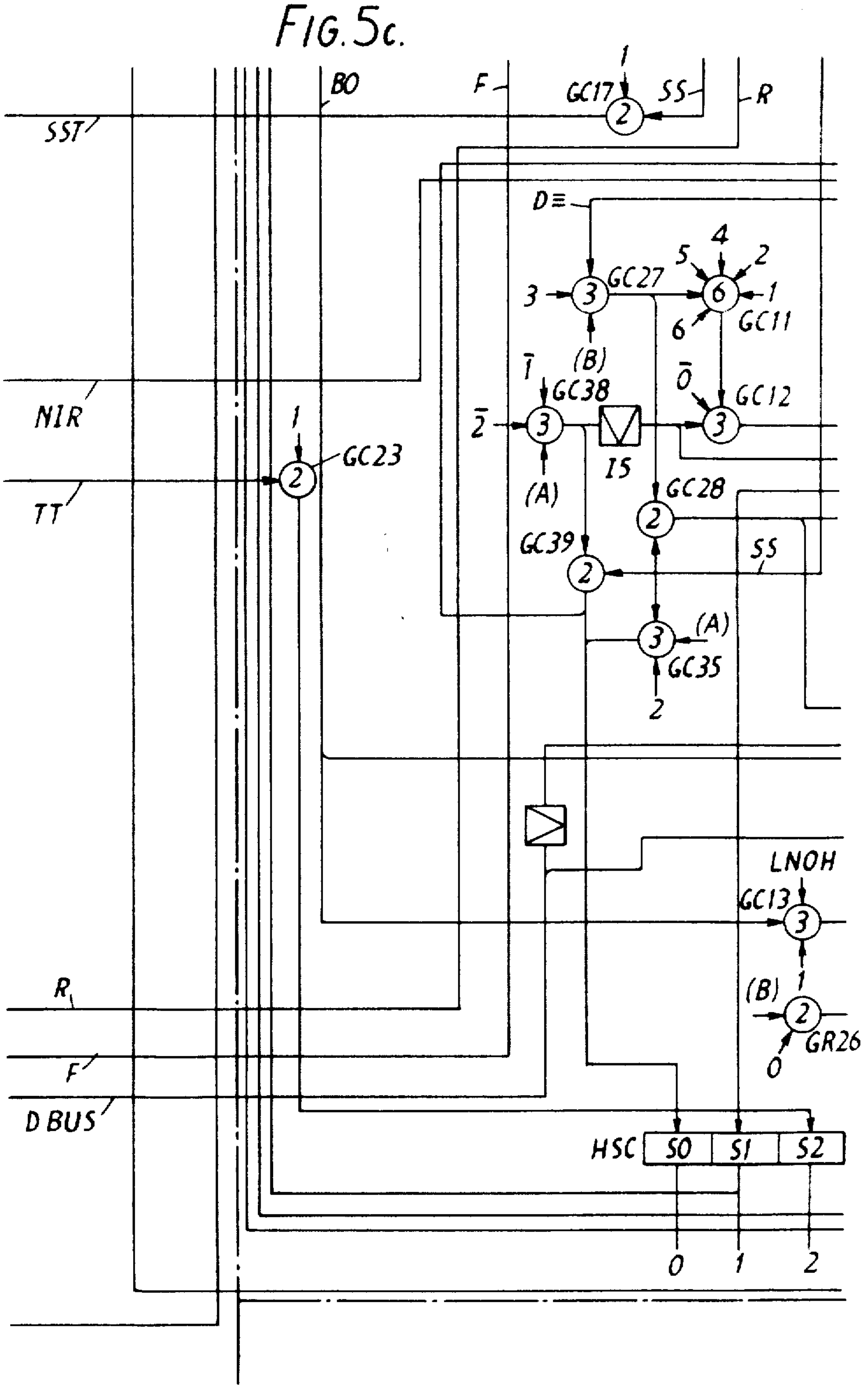
Figure 5D:
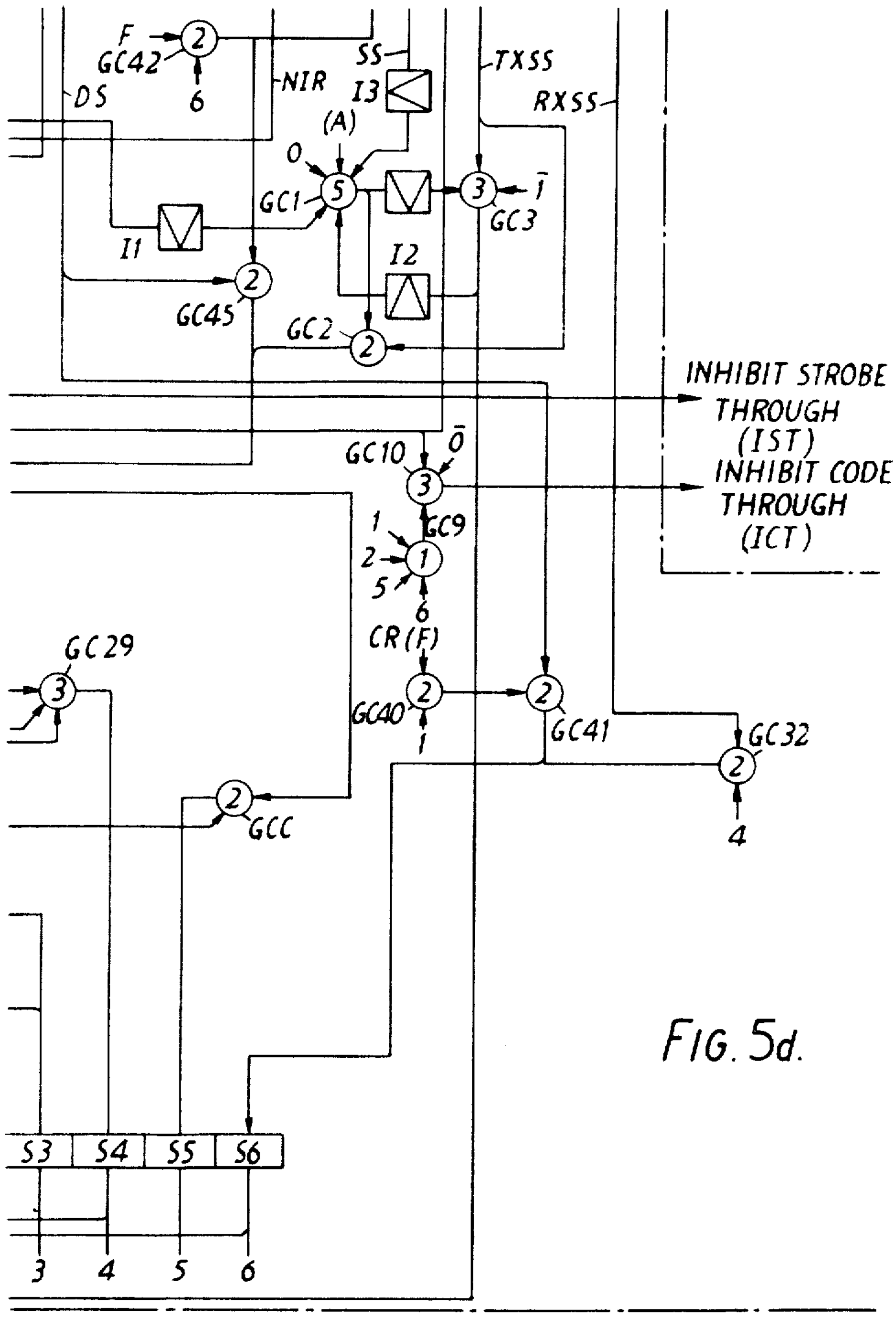

The production of the next instruction ready signal causes the drive control unit in state S1 to launch a strobe pulse on the strobe wire from the delay and strobe generator circuit D & STROBE GEN in FIG. 5*b*.

$$1 - GC15. NIR - GC16 - P5 \quad S18.$$

This causes the destination address (from the buffer data register BDR) on the data wires with the priority establishment code (from the coder CODER in the drive control unit) on the code wires to be accompanied by a strobe pulse. This information will be examined by all the drive control units on the highway and will cause the drive control unit of the required destination device, as specified by the destination address, to "break" the highway and to return the destination address plus either the destination free (J) or destination busy (L) code along with a strobe pulse to the demanding control unit.

The demanding drive control unit waits for the data and code to be returned accompanied by a strobe pulse.

When this occurs the strobe sense lead SS is activated causing a pulsed signal ST to be produced in the highway buffer as a consequence.

$$SS.1 - GC17 - SST. - SG4 - ST. \quad S19.$$

The production of pulse signal ST allows one of gates G8, G9 or G10 (FIG. 4*a*) to be opened in accordance with the state of the output of the buffer units decoder DECODER. At this stage the decoder is producing an output in accordance with the code on the code wires, fed to it by gates GC5 which are primed by GC4. The actual output produced will be either J (destination free), L (destination busy) or B (priority establishment). The latter code will be produced if no destination equipment exists on the highway corresponds to the destination address launched.

DEVICE FREE (CODE J RECEIVED)

In this case the production of the pulse signal ST causes (i) destination device free DF to be signalled to the demanding device accompanied by (ii) highway station ready HSR and (iii) the switching to state B2 of counter BSC.

ST.(J). $\overline{\text{FAULT}}$. - G8 - TFR - DF S20.

- G6 - HSR S21.

. $\overline{\text{B1}}$ - GB2 - TB2 - TB1 S22.

Device busy (code L received). In this case the production of the pulse signal ST causes (i) destination device busy DB to be signalled to the demanding device accompanied by (ii) highway station ready.

ST.(L). $\overline{\text{FAULT}}$. - G9 - TB - DB S23

- G6 - HSR S24

Device Non-Existant (code B received).

In this case the production of the pulse signal ST causes the retransmission of the destination address, by activating the repeat signal R to the control unit.

ST.(B). B1. $\overline{\text{FAULT}}$ - G10 - T3 - G11 - R S25

The generation of the repeat signal R by the buffer unit causes the same destination address together with the priority establishment code already on the highway to be accompanied by a further strobe pulse from the delay and strobe generator in the drive control unit.

R.1 - GC18 - P4 S26

If the same conditions exist upon the reception of the strobe pulse consequent upon the above mentioned further launched strobe pulse the highway buffer unit signals device non-existant DNE and highway station ready HSR.

ST. (B). $\overline{\text{FAULT}}$. B1 - GI0.T3 - G12 - TDNE - DNE S27

- G6 - HSR S28

A fourth condition may be experienced at this stage and this is when the returned destination address does not accord with the destination address launched. Under these circumstances the data comparator DATA COMP in the control unit (FIG.5*b*) will not produce signal D= . This condition will be detected by gate G34 causing toggle TFT to be set. The transmission fault routine will be entered at this point with the inhibition of gates G8, G9 and G10. The transmission fault routine will be considered in detail later.

From the above it can be seen that when the highway station ready signals HSR is produced it will be accompanied by either a destination free signal DF, a destination busy signal DF or a device non-existant signal DNE. If either of the latter signals occur the device will terminate the data transfer attempt by sending the terminate signal TERM. The effects of this signal will be considered later as it is the same as will occur when the data transfer is complete.

When the demanding device receives the highway station ready signal HSR accompanied by the destination device free signal DF from the buffer unit it causes the designation address to be loaded into the register which co-operates with the buffer data register BDR and then produces the proceed signal PROC and the designation character signal DES(TX).

The reception of the proceed signal PROC by the buffer unit causes (i) the removal of the highway station ready HSR and the destination free signals (ii) the presentation of the designation address to the data wires of the highway (iii) the production of the next instruction ready signal NIR.

PROC - G1 - SG1. $\overline{\text{B0}}$ - G14 - SET BDR S29

- SG2 - G12 - $\overline{\text{TFR}}$ - $\overline{\text{G5}}$ - $\overline{\text{HSR}}$ S30

- $\overline{\text{DF}}$ S31

.$\overline{\text{B0}}$ - G7 - NIR S32

At the same time the production of the designation character signal DES(TX) causes the C code (0100) to be set into the CODE REG in the highway buffer unit. The output of the CODE REG is presented, over gates GC22, to the code launch wires of the code drive unit CD and thence onto the highway code wires.

B2. 1 - GC19 - GC20 - GC22 S33

The production of the next instruction ready signal NIR causes a strobe to be launched to accompany the designation character as shown in Equation S18 above.

The designation character will be circulated around the highway to the destination device where it will be sensed and then re-transmitted back to the relevant drive control unit of the transmitting device. When the designation character arrives back at the transmitting drive control unit it is compared with that transmitted and the data comparator DATA COMP and the code comparator CODE COMP will produce equivalence signals if no transmission faults have occurred. The occurrence of the strobe pulse from the destination device causes signals continue CONT and highway station ready HSR to be produced by the buffer unit.

SST - SG4 - ST. CR = . $\overline{\text{FAULT}}$. B2. - G13 - TCT - CONT S34

- G6 - HSR S35

Again these signals will not be produced if the data transmitted does not agree with that received as the fault toggle TFT would be set.

When the demanding device receives the highway station ready signal accompanied by the continue signal it causes the next designation character or the first data character of the message to be loaded into the register which co-operates with the buffer data register BDR and then produces the proceed signal PROC accompanied by the designation character DES(TX) or the data character DATA(TX) signal.

The procedure will be identical to that shown above with reference to equations S29 to S32 with the data character code (D) (0110) launched if the data character signal DATA(TX) is present.

The operation of the system will continue using equations S18, S34 and S35 for the launching and reception of each data character of the message and equations S29 to S32 for the assembly of the data character to be launched.

All devices in the system when acting as a receiver are conditioned to receive a data packet consisting of a defined number of data characters and when the last data character has been received the receiver device is organized to change the code accompanying that data character from code C (0100) to code K (1010) which is defined as the end-of-block code.

Hence when the last data character of the message is returned to the transmitting control unit its code comparator CODE COMP does not produce the code equivalence signal C =thereby preventing the opening of gate G13 in accordance with equation S34. However the decoder DECODER in the buffer unit will produce a (K) output which allows the production of the highway station ready signal HSR accompanied by the end-of-block signal EOB by the buffer unit when the strobe accompanying the last data character is received.

SS 1 - GC17 - SST - SG4 - ST. $\overline{\text{FAULT}}$.(K) - G15 - TEOB - EOB. S36

- G6 - HSR S37

The reception of the end-of-block signal EOB by the device causes the device to produce the terminate signal TERM. This signal will be produced even if the end-of-block signal has arrived prematurely as far as the transmitting device is concerned. It was mentioned previously that the terminate signal will also be produced when the highway buffer generates the destination device busy, destination device non-existant or transmission fault signals.

The generation of the terminate signal TERM causes (i) the removal of the highway station ready HSR and end-of-block EOB signals and (ii) the generation of the terminate transmission signal TT to the drive control units.

TERM – TTM – G12 – $\overline{TEOB}$ – $\overline{EOB}$ S38

– $\overline{G6}$ – $\overline{HSR}$ S39

.$\overline{FAULT}$ – G16 – G17 – SG5 – TT S40

The production of signal TT, in the drive control unit which is set to state S1, causes this drive control unit to be set to state S2.

TT. 1 – GC23 – S2. S41

The cancellation of state S1 in the drive control unit causes the closure of gates GD1 (removes BDR from highway data wires), GC5 (removes the DECODER in the buffer unit from the highway code wires) and GC22 (removes the CODE REG in the buffer unit from the highway code wires). The cancellation of state S1 also closes gate GB2R whose inverted output resets the buffer state counter BSC to B0 (i.e. resets toggle TB2) and causes the highway station ready signal to be produced by equation 42 below and the terminate toggle TTM to be reset.

$\overline{TTXD}$. $\overline{ANYH1}$. $\overline{ANYH4}$. $\overline{ANYH6}$ – G18 – T2 – G5 – G6 – HSR S42

– $\overline{TTM}$ S43

The setting of the highway drive control unit counter HSC to state S2 maintains, at gates GC6, GC9 and GC11 the "broken" condition of the highway and causes a strobe to be launched by opening gate GC24. This causes the Free highway code A (0000) to be detected in all the drive control units of the highway causing them all to return to state S0 thereby ending the data transfer operation.

II. RECEIVING

As mentioned previously when a device requires use of a highway it extends its own priority address together with a priority establishment code. The priority establishment code (B) will be decoded by all the other highway drive control units on the particular highway causing the highway state counters of all those control units to be set to state S3.

(B). 0 – GC26 – S3 (R1)

The data comparator DATA COMP has the device's own hardward address PHA connected to it as gates GPA will be opened, the buffer unit being in state B0, and gates GD3 are all primed by the '1' state output from inverter ID. Hence when the destination address is connected to the data wires of the highway by the drive control unit of the sending device the data comparator in the drive control unit associated with that destination address specified device will produce the data equivalence D signal. At this time the code decoder SENSE in the drive control unit will be producing an output B (i.e. priority establishment code) and therefore gate GC27 will be open.

When the strobe accompanying the destination address arrives at the particular drive control unit the highway state counter HSC in that drive control unit will be set to state S4.

SS. GC27 – GC28 $\overline{D}$ $\overline{BUS}$. B0 – GC29 – S4 R2

It should be noted that if the actual device is out of service, due to a fault condition for example, gate GC29 would not be opened and in fact the counter would be switched to state S5.

The switching of the highway state counter HSC to state S4 causes the strobe wire to be broken at this highway drive control unit.

4 – GC11.$\overline{0}$.15 – GC12 - Inhibit strobe through (IST) R3

The switching of the highway state counter in the highway drive control units associated with the buffer unit produces a signal H4 and this will cause (i) an interrupt signal INT to be passed to the device, (ii) the highway station ready signal HSR to be removed and (iii) a receiver start signal RXSS to be produced.

H4. H1. B0 – G19 – INT R4.

– GDR – $\overline{TTXD}$ R5.

– $\overline{T2}$ – $\overline{G5}$ – $\overline{G6}$ – $\overline{HSR}$ R6.

. $\overline{H6}$. DEVF – GRSS – RXSS R7.

Equation R5 above shows the resetting of toggle TTXD, the transmit demand toggle and this operation covers the situation of a control unit being switched to the S4 state at the time when the device is starting a transmit operation but as yet has not occupied the highway. The transmit operation is therefore abandoned allowing the receive operation to take priority.

The production of the receiver start signal RXSS switches the highway drive control unit, currently standing in state S4, to state S6.

4. RXSS – GC32 – S6 R8.

The setting of the highway state counter HSC to state S6 causes (i) the setting of the control units coder CODER to code J (destination free code 1001) which will, therefore, be set onto the code launch wires of the code drive unit of the highway (ii) the launching of a strobe pulse on the strobe wire of the highway (iii), the inhibiting of gate GRSS in the buffer unit (H6) thereby terminating the receiver start signal RXSS and (iv) the termination of the interrupt signal INT to the device.

6. B0 – GC33 – LJ R9

– P2 R10

At this stage the data leads of the highway have not been broken hence the production of the above strobe pulse returns the destination address to the sender accompanied by the destination free code (i.e. code J).

After the strobe has been launched the delay and strobe generator circuit D & STROBE GEN produces a delayed strobe DS which causes the state counter in the highway buffer to be switched to state B2.

DS.6 – GC34 – SRR – TB2. R11

The switching of the buffer unit to state B2 causes (i) the data sense wires of the highway data drive unit to be connected through to a register in the associated device via the data output leads of the buffer unit, (ii) the code sense wires of the highway code drive unit to be connected to the DECODER in the buffer unit (iii) the output of the buffer data register BDR to be connected to the code launch leads of the highway code drive unit and (iv) the "breaking" of the data through path in the highway data drive unit (v) while maintaining the "broken" condition of the code and strobe through paths.

B2.6 – GC35 – GD2 R12.

– GC4 – GC5 R13.

– GD1 R14.

– GC6 – GC7 - Inhibit data through(IDT) R15.

The launched destination free code (J) together with the accompanying strobe will be received by the transmitting device which will now launch the designation address plus the designation character code (C) and an accompanying strobe.

The designation address will be fed, over gates GD2 into the register in the receiving device and the designation character code will be decoded by the SENSE circuit in the particular highway drive control unit and the DECODER in the associated buffer unit. Both these equipments will therefore produce a (C) output.

When the strobe pulse accompanying the designation information arrives the receive strobe signal SR is activated.

SS.GC35 - GC36 - SSR - SG3 - SR. R16.

The production of the pulse signal SR in the buffer unit causes the production of the designation signal DES(RX) to the receive device causing that device to use the designation address, which is now in the register connected to the data output leads of the buffer unit, to select the required mode of reception.

(C) - G21.SR - G22 - T4.(C) - G23 - DES. R17.

When the device is organized into the required mode of reception it produces a data acceptance signal DA which (i) gates the received designation address, in its own register, into the buffer data register BDR, in the buffer unit, and hence onto the data launch wires of the data drive unit associated with the drive control unit in state S6, (ii) terminates the designation signal (DES(RX) and (iii) produces the next instruction ready signal NIR and (iv) gates the designation character code into the CODE REG of the buffer unit.

DA - G1 - SG1 - G14 - SET BDR R18.

- SG2 - $\overline{T4}$ - $\overline{G23}$ - $\overline{DES}$ R19.

- G7 - NIR R20.

- G24 - G25 R21.

The production of the next instruction ready signal causes the drive control unit to launch a strobe pulse to accompany the designation address and code on the highway back to the transmitter.

6 - GC15. NIR - GC16 - P5 R22.

The transmitter device will receive the returned designation information and will respond with the first data character of the message accompanied by a strobe pulse. Hence the data character when received at the receiving highway drive control unit will be passed, over gates GD2, into the register in the device and the SENSE and DECODER equipments, in that control unit and the associated buffer unit, will produce (D) outputs.

When the accompanying strobe pulse occurs the generation of pulse SR will cause the data character signal DATA to be produced by the buffer unit.

(D) - G21.SR - G22 - T4. (D) - G24 - DATA R23.

The receiver will now transfer the data character from the receiving register into one of its working registers as required and will then respond with the data accept signal DA. This has the same effects as stated above for Equations R18 to R22 except that the data character signal will be removed (i.e. Equation R19 is modified as the reset of toggle T4 closes gate G24) and the received data character information is returned to the transmitting device.

The above operations, as specified by equation R18 to R23, will be repeated for each data character of the message until the last data character has been received. As mentioned previously the receiving device is organized to count down the number of characters received and to send an end-of-block signal when the data transfer block is completed as far as it is concerned.

When the last character of the block has been received the receiving device signals end-of-block EOB in place of data accept DA and this causes the last data character to be relaunched back to the transmitting device accompanied by the end-of-block code (K) together with an accompanying strobe pulse.

EOB - S(K) into CODE REG R24

- G1 - SG1 - G14 - SET BDR R25

- SG2 - $\overline{T4}$ - $\overline{G24}$ - $\overline{DATA}$ R26

- G7 - NIR R27

6 - GC15 - NIR - GC16 - P5 R28

The end-of-block code when received by the transmitting device will be tested and if the block transfer is complete the "end of message" operations will be organized at the transmitting device the terminate transmission operation causing the free highway code (A) to be presented to the code wires accompanied by a strobe pulse.

The reception of the free highway code (0000) produces an (A) output from both the SENSE and DECODER in the control unit and the buffer unit respectively at the receiver. When the accompanying strobe is received by the relevant control unit the highway state counter HSC of that unit is switched to state S0.

(A). $\overline{1}$. $\overline{2}$. - GC38. SS - GC39 - S0 R29

The switching to state S0 of counter HSC causes the closure of the data and code extension paths (gates GD2 and gates GD1) and the re-establishment of the through connection paths for the data, code and strobe wires of the highway by the removal of the data through inhibit (gate GC35 closed), the removal of the code through inhibit (gate GC9 closed) and the strobe through inhibit (gate GC11 closed).

The switching to state S0 of the counter HSC also causes the switching of the buffer state counter BSC to state B0 and the production to the receiving device of the end of message signal EOM.

$\overline{H6}$ - GB2R - $\overline{TB2}$ R30

$\overline{H6}$ - 0. $\overline{B2}$ - G27 - TEOM - EOM R31

The production of the end of message signal EOM is acknowledged by the associated device by the production of the data accept signal which removes the end of message signal and restores the buffer unit and the control unit to the idle state.

DA - G1 - SG1 - SG2 - $\overline{TEOM}$ - $\overline{EOM}$ R32

- $\overline{G28}$ - $\overline{DBUS}$ R33

III. RESPONSE-CHANGEOVER

In certain cases it may be that the device originating the data transfer requires to act as a receiver for the actual data transfer. In such cases the demanding device after sending the last designation character signals response-changeover RC/O to its buffer unit. It should be noted that the buffer unit associated with the demanding device will be in state B2 at this stage and the highway drive control unit associated with that buffer unit will be in state S1. The response changeover signal RC/O will be accompanied, in normal manner, by a proceed signal PROC which causes equations S15 to S17 to be performed as normal. However the production of the response changeover signal RC/O causes the response changeover code (F) to be set into the buffer units CODE REG. Hence the production of signal P5, equation S18 above, causes the response changeover code to be launched accompanied by a strobe pulse.

The delayed strobe pulse DS produced by the delay and strobe generator D & STROBE GEN causes the setting of the highway state counter in the control unit of the demanding device to state S6 (i.e. the receive state) by opening gate GC41. This gate is fed with the output of gate GC40 which will be open at this stage as the highway counter HSC is in state S1 (i.e. the transmitting state) and the CODE REG in the buffer unit has been set to code (F) by the response changeover signal RC/O. The CODE REG equipment produces a signal CR(F) when code 1101 is in it and this signal opens gate GC40 when the control unit is in state S1.

At this point, therefore, both highway drive control units involved in the data transfer operation will be in state S6 and the original demanding device will have launched the response changeover code (F).

The reception of the response changeover code (F) at the destination highway drive control unit causes an (F) output from the SENSE equipment together with the DECODER in the buffer unit (gates GC5 being held primed by gate GC35 through gate GC4).

The reception of the strobe pulse accompanying the response changeover code causes (i) the response changeover performed code (H) to be set into the code register CODE REG and hence onto the code wires of the highway and (ii) a strobe to be launched to accompany the above mentioned code (H).

SS. GC35 — GC36 — SSR — SG3 - SR. (F) — G30 — S(H) RC1.

(F).6 - GC42 - GC43. SS - Gc44 - P6 RC2.

The production of the delayed strobe DS, in response to signal P6, by the D & STROBE GEN equipment of the destination highway drive control unit causes that control unit to be switched to state S1 (i.e. the transmitting state)

DS. GC42 - GC45 - S1. RC3.

At the highway drive control unit of the demanding device the received response changeover performed code (0101) is decoded to code (H) by the SENSE equipment in the control unit and the DECODER equipment in the buffer unit.

When the strobe accompanying the response changeover performed code (H) is received the demanding highway control unit responds by retransmitting this code back to the demanding device.

(H).6. - GC46 - GC43.SS - GC44 - P6 RC4.

When the response changeover performed code is received back at the highway drive control unit of the destination device it is decoded by the SENSE equipment to produce an (H) output and the CODE COMP equipment of that unit produces a code equivalence signal C which causes a code register equivalence signal CR .

1. B2 - GC19. C ▪ - GC21 - CR ▪ RC5.

When the strobe accompanying the returned response changeover performed code is received the highway station buffer receives the continue signal CONT and the highway station ready signal HSR SS.1 - GC17 - SST - SG3 - SR.CR ▪ . $\overline{\text{FAULT}}$.B2 - G13 - TCT - CONT RC6

- G1 - HSR RC7

The reception of these signals by the destination device causes the data transfer operation to be continued with that device acting as a transmitter and the demanding device acting as a receiver.

IV. QUEUE CONDITIONS

IV*A*. QUEUE FULL

In the case of a data transfer from one device to another it may happen that the destination addressed device is unable to accept the message at this time as the queue into which the message is to be placed is full. Under these circumstances the reception of the designation address or the first data character of the message will be replied to by the destination device by the production of the queue full signal QF(RX) which causes the designation or data character signal to be reset and a next instruction ready signal NIR to be sent from the highway buffer to the relevant highway drive control unit.

QF(RX) - S(M) Q1.

- CR1 - SG1 - SG2 - $\overline{\text{T4}}$ - $\overline{\text{DES(RX)}}$ or $\overline{\text{DATA(RX)}}$

Q2 .B0–G7–NIR.

The production of the next instruction ready signal NIR causes a strobe launch operation to be performed, as shown in equation R22 above, causing the designation address or data character plus the queue full code (M), which has been set into the CODE REG of the buffer unit, to be sent back to the transmitting device with a strobe pulse.

The reception of the queue full code (M) in the highway drive control unit of the transmitting device is decoded in the DECODER equipment of the associated buffer unit allowing the production of a queue full signal QF(TX) and the highway station ready signal by the buffer unit when the accompanying strobe pulse occurs.

SS.1 - GC17 - SST - SG3 - SR. FAULT.(M) - GQF - TQF - QF(TX) (Q3)

- G1 - HSR (Q4)

The demanding device acknowledges these signals with the terminate signal TERM which, as shown above equations S38 to S43, terminate the transmission attempt.

IV*B* QUEUE EMPTY

This condition will usually occur when a response-changeover operation has been performed as a transmitting device would not initiate a transfer if it had no message to send. However in the case of a response-changeover operation the initiator of the transfer is to act as the receiver of the message, thus it may well be that the destination device which is to act as the transmitter, is not yet ready to do so as it has not yet formed a message.

Hence the first character of the message, which is meaningless, is accompanied by a queue empty code (E). The transmitting device produces the proceed signal PROC accompanied by the queue empty signal QE(TX).

PROC - G1 - SG1 - SG2 - $\overline{\text{T2}}$ - $\overline{\text{G5}}$ - $\overline{\text{G6}}$ - $\overline{\text{HSR}}$ Q5

.$\overline{\text{B0}}$ - G14 - SET BDR Q6

.$\overline{\text{B0}}$ - G7 - NIR Q7

QE(TX) - (SE)

The production of the next instruction ready signal NIR causes a strobe launch operation to be performed, as shown in equation S18 above, causing the first data character of the message plus the queue empty code (0111) to be sent to the other device accompanied by a strobe pulse.

At the receiver the queue empty code (E) is decoded by the DECODER equipment in the buffer unit and when the strobe pulse occurs the queue empty signal is passed to the device.

SS.GC35 - GC36 - SSR - SG3 - SR. G21 - T4.(E) - GQE - QE (Q8)

This is replied to by a normal data accept signal DA which returns the data character and queue empty code (E) to the transmitter, as shown in Equation R18 to R22 above.

At the transmitter the production of the highway station ready signal HSR causes the production of the terminate signal TERM which (as shown in equations S38 to S43 above) terminates the transmission attempt.

V. FAULTS.

After the transmission of each item of information the transmitting device monitors the highway, on the input to its drive control unit, and compares the transmitted information with that retransmitted.

The test for a fault condition is performed in the duration between the reception of the leading edge of the strobe sense and the leading edge of the reconstituted strobe pulse ST (i.e. the duration of the delay period incorporated in strobe generator SG4). Toggle T7 is set for this duration allowing one of the fault detection gates G34, G37 or G43 in the buffer unit to be activated if necessary. Gates G34 and G37 are used while the buffer unit is in state B1. Whereas gate G43 is used while the buffer unit is in state B2.

V*A* FAULT DETECTED IN STATE B1

A fault occurring while the buffer unit of the transmitter is in state B1 will be in connection with the transmission of the destination address. A fault of this nature falls into one of two catagories (i) non-equivalence of destination addresses or (ii) an incompatible code returned with the correct destination address.

V*AI* DESTINATION ADDRESSED DO NOT EQUATE

In this case gate G34 will be opened as the data comparator in the control unit will be giving a '0' output causing the fault toggle TFT to be set.

$\overline{B0}.\ DR \neq .\ T7 - G34 - TFT$ F1

The setting of the fault toggle TFT causes the production of the transmission fault signal TF(TX) and the extension of the receiver not accepted signal RXNA to all associated highway drive control units.

TFT. ST. B1 - G36 - TTF(TX) - TF(TX) F2

- G35 - GRXNA - RXNA F3

The trailing edge of the pulse from gate G36, under the control of the pulse ST, causes the reset of toggle TFT on its edge activated input (marked with an asterisk) to its reset side.

The reception of the transmission fault signal TF(TX) by the device causes the abandonment of the transmission attempt by the production of the terminate signal TERM causing the release of the highway as shown in section (1) above in equations S38 to S43 (toggle TTF(TX) being reset by gate G12).

(*VAII*) CODE INCOMPATIBLE

In this case gate G37 will be opened, as the code received is other than destination free/busy or non-existant, again causing the fault toggle TFT to be set.

$(\bar{J}).(\bar{L}).(\bar{B}).B1.T7 - G37 - TFT$ F4

The setting of toggle TFT causes the same operations as above with reference to equations F2 and F3, causing the termination of the transmission attempt and the freeing of the highway.

(*VB*) FAULT DETECTED IN STATE B2

A fault occurring while the buffer unit of the transmitter is in state B2. will be in connection with the transmission of (i) a designation or data character or (ii) the code associated therewith.

(*VBI*) DESIGNATION OR DATA CHARACTERS DO NOT EQUATE

In this case gate G34 will again be opened causing toggle TFT to be set as shown in equation F1 above.

The setting of toggle TFT opens gate G38 causing the trailing edge of the ST pulse to set toggle T8 which in turn generates the fault signal F to the drive control units.

$TFT.B2 - G38.\overline{T8}.ST - T8 - F$ F5.

The production of the fault signal F in the control unit in state S1 (i.e. that drive control unit acting as the transmitter) causes the last designation address or data character to be retransmitted accompanied by the fault status code (G) and a strobe pulse.

F.1 - GCIF - LG F6.

- P3 F7.

The retransmitted designation address or data character qualified by the fault status code and accompanied by a strobe will be passed over the highway to the receiver.

At the receiver, the reception of the fault status code (G) causes the production of the character fault signal by the associated buffer unit at the trailing edge of the SR pulse.

$(G).\ SR - G44 - TCF.\overline{T11} - G45 - CF.$ F8.

The character fault signal CF will be recognized by the receiving device and it will prepare for the reception of the retransmission of the character in error, while signalling data accept DA to the buffer unit.

The production of the data accept signal causes (i) the toggle T10 to set, (ii) toggle TCF to be reset and (iii) the next instruction ready signal NIR, as shown in equation R to be produced.

DA - G1 - SG1 - SG2.TCF - G46 - T10 F9.

$-\overline{TCF}-\overline{CF}$ F10.

It should be noted that toggles T10 and TCF will be switched on the trailing edge of the pulse produced by pulse generator SG2.

The generation of the next instruction ready signal NIR causes the recirculation of the received information accompanied by a strobe pulse as shown in equation R above, the accompanying code of course being the fault status code (G).

The reception of the strobe accompanying the re-circulated fault status defined data by the transmitter causes the setting of toggle T9 and thereby one generation of the repeat signal R which causes the original data and associated code which had been adjudged faulty when returned previously to be re-transmitted. Again togles T8 and T9 are switched on the trailing edge of the ST pulse.

T8.ST - G40 - T9 - G11 - R F11.

$-\overline{T8}$ F12.

R.1 - GC18 - P4 F13.

At the receiver the reception of the re-transmitted information causes an identical operation for the reception of any normal information and this is acknowledged as usual by a data accept signal DA. This signal causes the normal sequence of events, as shown above in equations R18 to R22 relating to signal NIR and its effects, for the recirculation of the received information together with the setting of toggle T11 and the reset of toggle T10 on the trailing edge of the pulse from pulse generator SG21.

SG2.T10 - G47 - T11 F14.

$-\overline{T10}$ F15.

The reception of the re-circulated repeated information will again be checked at the transmitter and if still in error toggle TFT will again be set (see Equation F1 above). However at this stage toggle T9 is set causing the production of the transmission fault signal TF(TX) together with the setting of toggle T8 again.

TFT.B2 - G38.ST.T9 - G42 - TTF(TX) - TF(TX) F16.

The setting of toggle T8 causes the fault status code (G) accompanied by a strobe to be sent for a second time, see Equations F11, 12 and 13 above.

The reception of the fault status code (G) for the second time at the receiver causes the setting of toggle TCF, as shown in Equation F8 above, however the set state of toggle T11 causes the generation of the transmission fault signal TF(RX) at this stage.

The receiver will again respond with the data accept signal DA causing the fault status code to be returned to the transmitter with an accompanying strobe.

The receipt of the strobe at the transmitter causes the highway to be cleared, using the free highway code plus a strobe, provided the device has acknowledged the transmission fault signal TF(TX) with the terminate signal TERM. The transmission attempt is therefore abandoned and the originating device will be used to set up a further data transfer indicating the occurrence of a transmission fault to some overall "executive" device.

(*VBII*) CODE ACCOMPANYING DESIGNATION OR DATA CHARACTERS IS INCOMPATIBLE

In this case gate G43 will be opened as the code comparator will not be producing C = while toggle T7 is set causing toggle TFT to be set with the same re-transmission effects as shown in section (*vbi*) above.

RECEIVER DEVICE BUSY

State S5 operations

When a control unit is switched to state S5 by the opening of gate GCC as the device is busy the associated highway is presented with the destination busy code and an accompanying strobe is launched.

$$5 - GC11 . \overline{0} . I5 - GC12 - IST \quad P1.$$

$$- GC9 . \overline{0} . I5 - GC10 - ICT \quad P2.$$

$$- LL \quad P3.$$

$$- GC24 - P2 \quad P4.$$

The reception of the destination busy code by the transmitter causes a clear-down of the highway allowing the control unit to return to state S1.

Figure 4A:
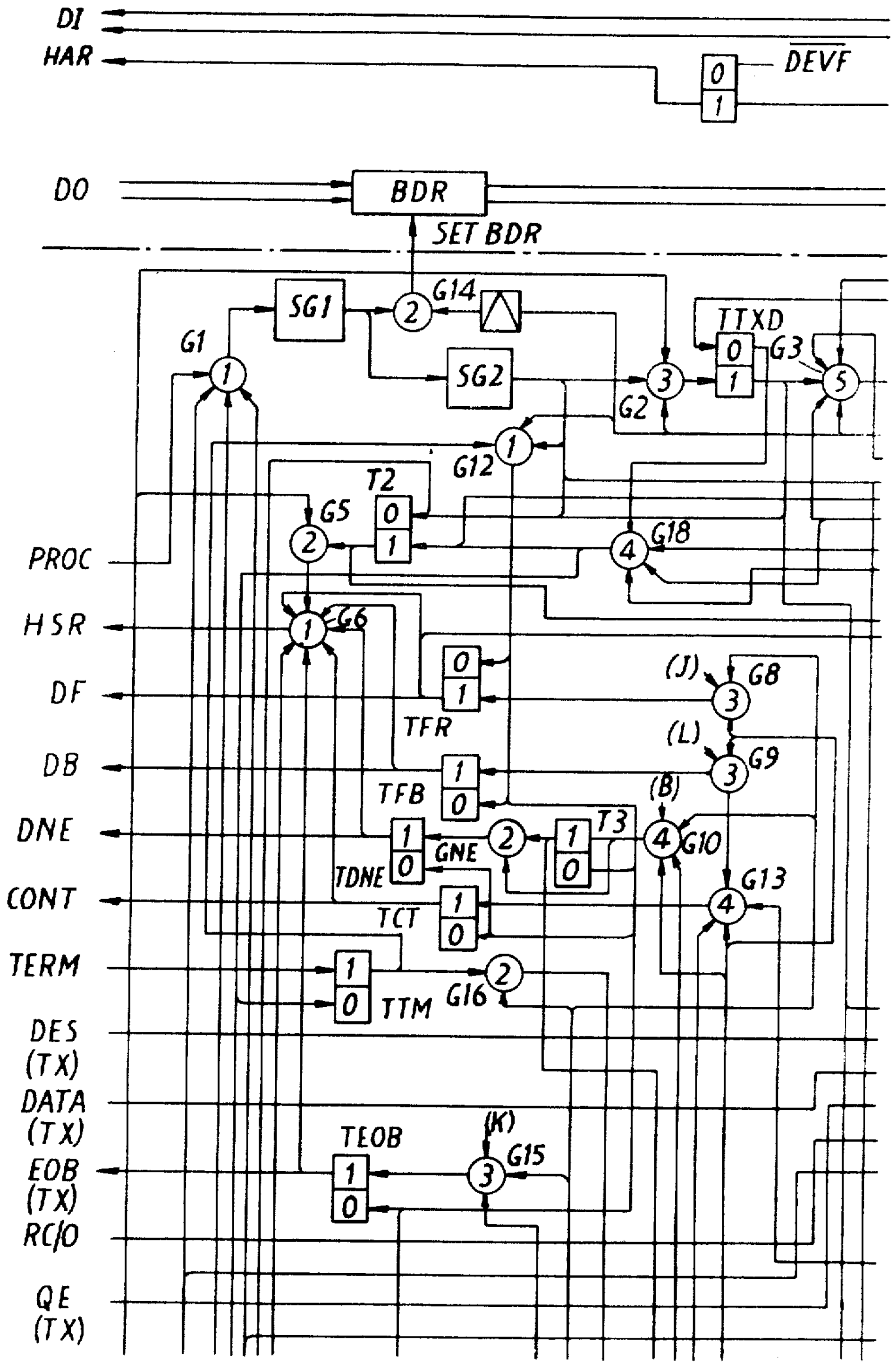
Figure 4B:
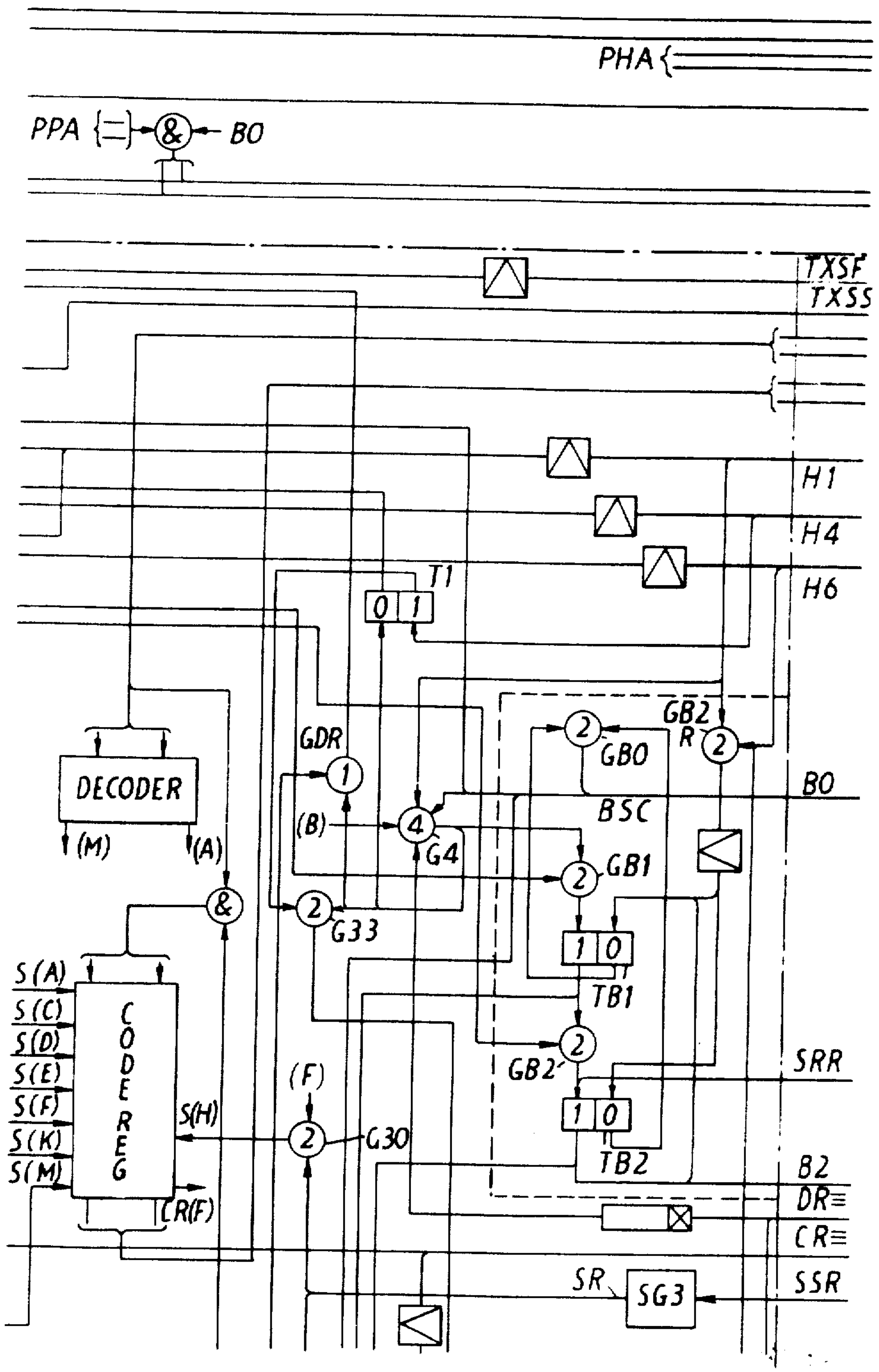
Figure 4C:
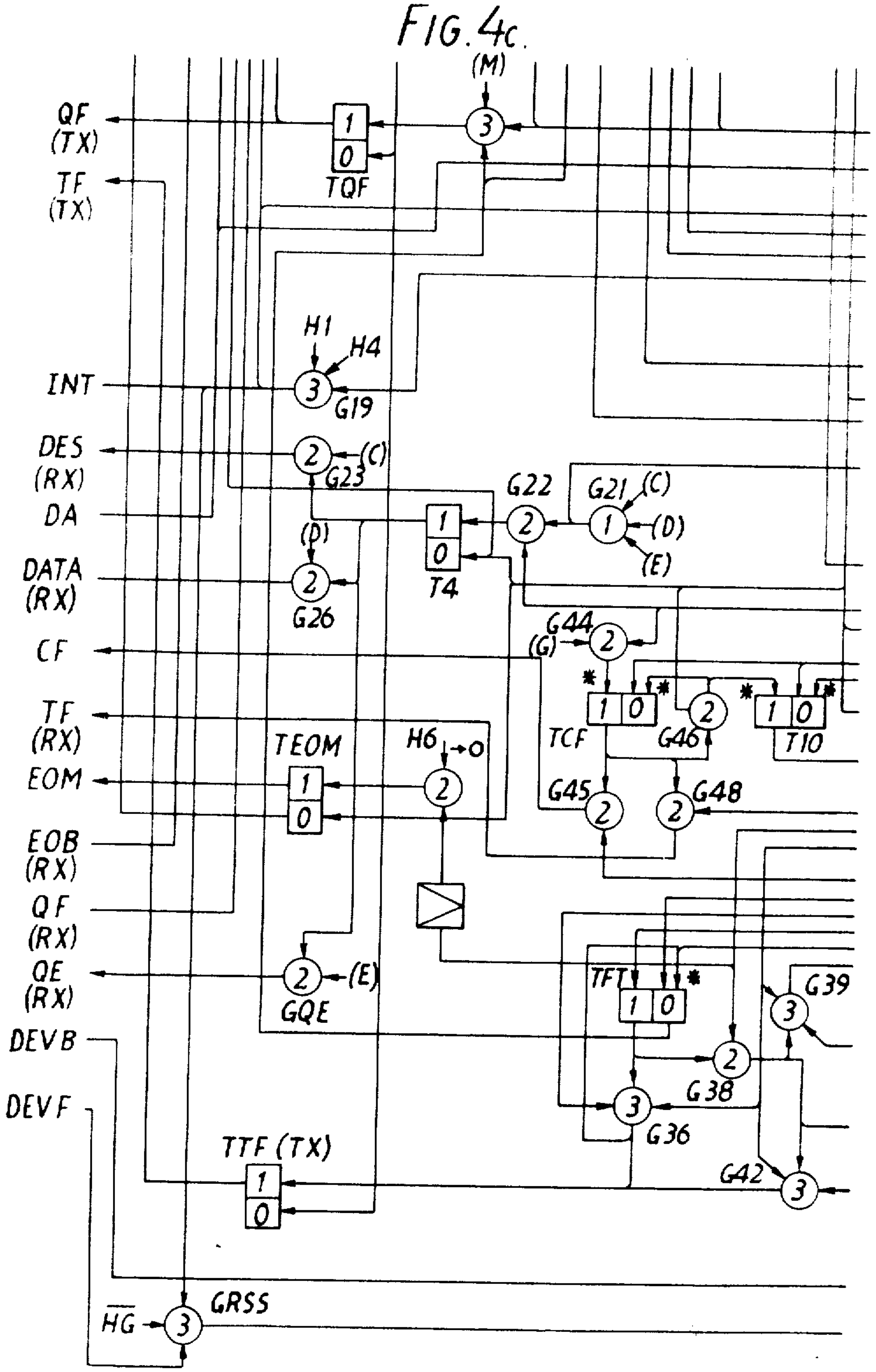
Figure 4D:
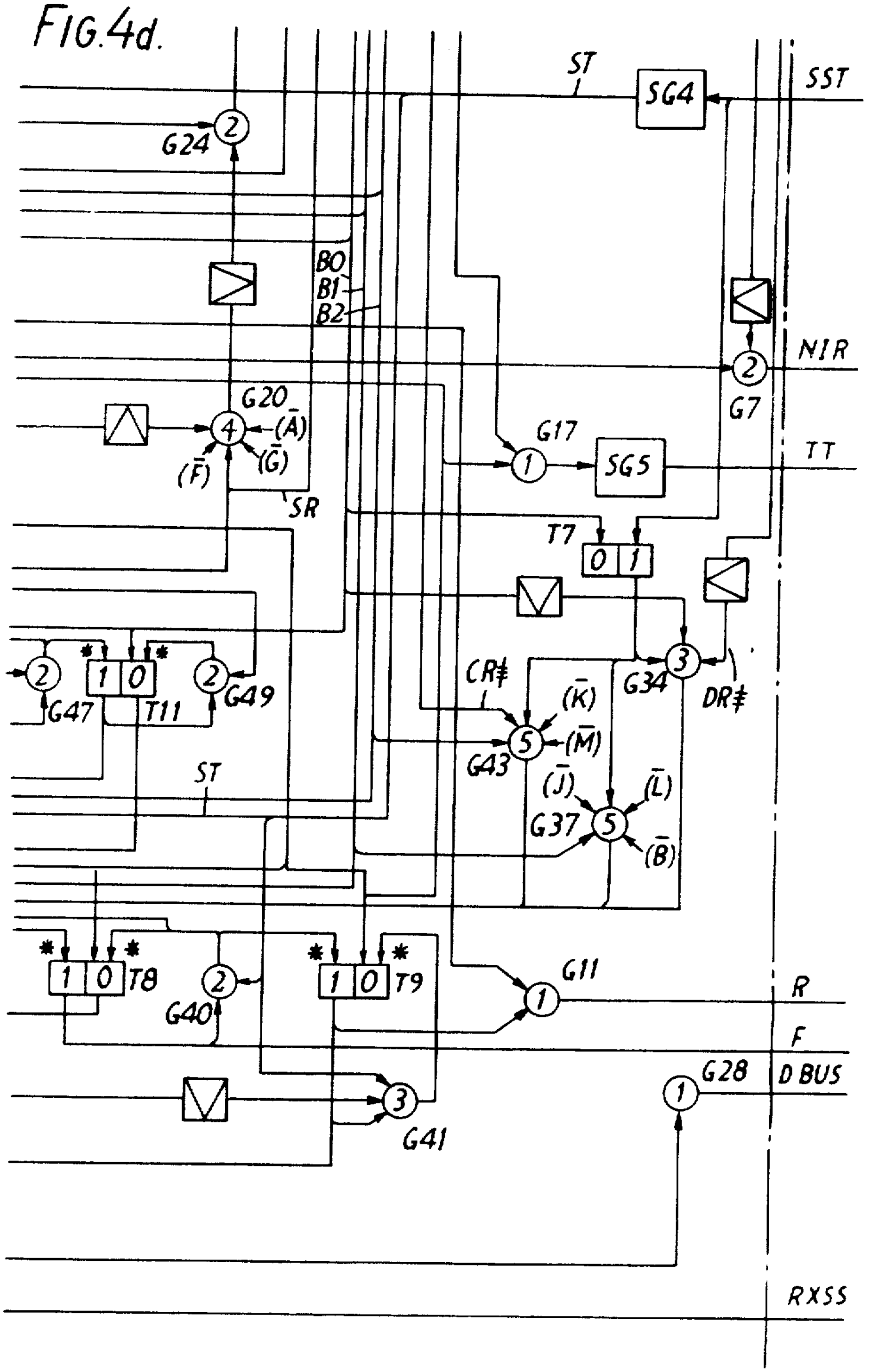

The upper section of the buffer unit, shown in FIGS. 4*a* and 4*b*, is particularly related to those devices of the system which are only allocated (*a*) a single address for identification and priority purposes or (*b*) one address each for identification and priority purposes. In the first case the identification or hardware address PHA and the priority address PPA will be identical and the coding of these addresses in the buffer unit may be provided by the connection of the groups of leads PHA and PPA to discrete voltage levels in accordance with the required address coding. In the second case separate codings are provided for each address and under certain circumstances it may be arranged that more than one device of the system is provided with the same hardware address thereby allowing the same message to be sent to more than one device concurrently.

In certain circumstances it may be necessary to provide multi-addressing facilities. Such facilities are required for example when a processor is operated in a so-called time sharing or multi-program environment. In such circumstances it is necessary for peripheral equipment or other processors to pass information to a particular program (i.e. to a specific area of the processor) rather than just to the processor itself. In the case of multi-address devices where each address must be separately accessed it is necessary to provide, in addition to the hardware address PHA, one address code register for each additional address. These addresses may, for example, be held in separate registers whose outputs are applied to discrete comparators. The "other" input to these discrete comparators is provided by the DATA SENSE leads from the highway data drive unit and the data equivalence signal for each comparator would then be "ored" with the D signal from the DATA COMP of FIG. 5. The output of each separate register could also be made switchable into the PPA input of the buffer unit when the particular program segment requires the use of the highway. It should be noted that provision must be made for filling the separate registers with the relevant addresses (called symbolic addresses) when allocating these addresses to the particular device. Under such circumstances the device will be "called" using its hardware address PHA and the message passed will be the symbolic address codes of for example the programs to be loaded into the device. Before the device becomes "active" in the data processing system the separate registers must be filled in accordance with the symbolic address now allocated to that device.

The system may include a number of highways and these may be arranged to be used in turn. The highways need not include the devices in the same order or precisely the same group of devices. From the point of view of reliability, however, it is preferable for the highways to be arranged in pairs, the connections to each member of a pair being identical. One subsidiary device is provided for each pair to act as a highway monitor. This normally arranges for each of the highways of a pair to be used alternately but it is also arranged to detect faults on the highway and will prevent a faulty highway from being brought into use.

We claim:

1. A data handling and transmission system comprising:

a. a common data communication highway arranged in a closed loop and having an information path for the passage of address and data information and a control path for the passage of control signals indicative of the type of information on said information path; and b. a plurality of data handling stations interconnected by said common data communication highway for communication between any one and any other thereof, each said station having i. first means connected to said common data communication highway for transmitting information and control signals thereon;

ii. second means connected to said common data communication highway for receiving information and control signals therefrom, iii. an interconnecting path connecting said first means and said second means, iv. third means for breaking said interconnecting path, v. fourth means for storing an own station priority number, vi. fifth means connected to said second means and said fourth means for comparing said own station priority number stored in said fourth means with information received from said common data communication highway by said second means, vii. sixth means connected to said common data communication highway for determining whether said highway is free, and viii. seventh means responsive to the station requiring to communicate with one of the other stations over said common data communication highway to connect said fourth means to said first means so as to apply said own station priority number to said first means; to operate said third means to break said interconnecting path; to activate said sixth means and responsive to an indication therefrom that said highway is free to activate said first, second and fifth means so that said own station priority number is applied to said information path, a priority number indicating code is applied to said control path and said information received is compared with said own station priority number to determine its relationship thereto; and responsive to an indication by said fifth means that said information received is greater than said own station priority number to release said third means to restore said interconnecting path and to disconnect said first and fourth means so that said own station priority number is removed from said first means.

2 A data handling and transmission system as defined in claim 1 wherein said seventh means in each station includes sequence control means responsive to said information received being equal to said own station priority number to remove said own station priority number from said first means and to replace it by a destination address indicative of the destination data handling station with which communication is required; and wherein said first means in each station is operative to transmit said destination address on said information path and to transmit a destination character code on said control path.

3. A data handling and transmission system as defined in claim 1 wherein each data handling station includes sequence control means sensitive to the control signals on said control path and wherein means are provided for operating said third means when said control path carries a destination character code and said fifth means indicates equality between said own station priority number and said information received.

4 A data handling and transmission system as defined in claim 3 wherein, in each station, said sequence control means is operative on said first means to cause it to transmit said destination address on said information path and to transmit on said control path a control signal indicative of the busy or free state of said destination data handling station in response to the reception of a destination address indicating said destination data handling station.

5. A data handling and transmission system as defined in claim 4 wherein each data handling station includes means for conditioning said first means to transmit a response changeover code signal on said control path and responsive changeover means, said response changeover means in said destination data handling station becoming active in response to receipt of said response changeover code signal so that the subsequent direction of data transfer is from said destination data handling station to the originating station.

* * * * *

UNITED STATES PATENT OFFICE
CERTIFICATE OF CORRECTION

Patent No. 3,680,053 Dated July 25, 1972

Inventor(s) John Michael Cotton, et. al.

It is certified that error appears in the above-identified patent and that said Letters Patent are hereby corrected as shown below:

On the cover sheet [63] "638,803, May 15, 1967, Pat. No. 3,444,755." should read -- 638,303, May 15, 1967, now abandoned. -- .

Signed and sealed this 20th day of March 1973.

(SEAL)
Attest:

EDWARD M.FLETCHER,JR.
Attesting Officer

ROBERT GOTTSCHALK
Commissioner of Patents